(12) United States Patent
Lustig

(10) Patent No.: US 8,445,860 B2
(45) Date of Patent: May 21, 2013

(54) BORON-10 COMPOUNDS FOR NEUTRON CAPTURE LAYER

(75) Inventor: James Michael Lustig, Mantua, OH (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 13/220,071

(22) Filed: Aug. 29, 2011

(65) Prior Publication Data

US 2013/0048871 A1 Feb. 28, 2013

(51) Int. Cl.
*G01T 3/00* (2006.01)

(52) U.S. Cl.
USPC .................................................. 250/390.01

(58) Field of Classification Search
USPC .................................................. 250/390.01
See application file for complete search history.

(56) References Cited

U.S. PATENT DOCUMENTS

2003/0213917 A1* 11/2003 Menlove et al. ......... 250/390.01

* cited by examiner

*Primary Examiner* — David Porta
*Assistant Examiner* — Hugh H Maupin
(74) *Attorney, Agent, or Firm* — Cooper Legal Group, LLC

(57) ABSTRACT

A neutron detector includes a shell bounding an interior volume. A portion of the neutron detector serves as a cathode. The detector includes a central structure located within the interior volume and serving as an anode. The detector includes a boron coating on the interior of the wall wherein at least some of the boron coating is heat diffused into the wall from a boron-containing powder to form the boron coating which is sensitive to neutrons. The detector includes an electrical connector operatively connected to the central structure for transmission of a signal collected by the central structure. An associated method of heat diffusing the boron includes subjecting boron-containing powder to an elevated temperature so that a quantity of the boron-containing powder heat diffuses.

20 Claims, 4 Drawing Sheets

1

BORON-10 COMPOUNDS FOR NEUTRON CAPTURE LAYER

BACKGROUND OF THE INVENTION

1. Field of the Invention

The invention relates to boron coatings for neutron detection, and specifically relates to heat diffusion application of boron coatings for neutron detection.

2. Discussion of Prior Art

Neutron detectors can include boron coatings to interact with passing neutrons and release charged particles into an enclosed volume to create an electrical signal. Optimal performance of the neutron detector can depend upon several factors including: boron coating thickness uniformity, presence of other elements and compounds, and the ratio of particular boron isotopes in the total boron coating content. Previously known methods of depositing the boron onto a surface of the neutron detector can create coating thickness irregularities. These same methods can create boron coatings with undesired gaps caused by capillary action around microfeatures of the detector surface or by the limitations of line-of-sight boron applications. Other known methods include the use of binders to adhere the boron to the neutron detector, introducing impurities that can interfere with neutron detection. Additionally, some previously known methods of depositing the boron onto a surface of the neutron detector can be relatively expensive. Therefore, there is a need for an optimized boron application process that creates relatively thin, uniform boron coatings over the length of the neutron detector with minimal traces of other elements and compounds.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a neutron detector that includes a shell bounding an interior volume. A portion of the neutron detector serves as a cathode. The detector includes a central structure located within the interior volume and serving as an anode. The detector includes a boron coating on the interior of the wall wherein at least some of the boron coating is heat diffused into the wall from a boron-containing powder to form the boron coating which is sensitive to neutrons. The detector includes an electrical connector operatively connected to the central structure for transmission of a signal collected by the central structure.

Another aspect of the invention provides a method of diffusing a boron-containing powder into a substrate surface to create a neutron capture layer for neutron detectors. The method includes providing an electrically conductive substrate and placing the boron-containing powder into contact with the electrically conductive substrate. The method includes subjecting the boron-containing powder and the electrically conductive substrate to an elevated temperature so that a quantity of the boron-containing powder heat diffuses into the electrically conductive substrate forming a boron coating which is sensitive to neutrons. The method includes incorporating the electrically conductive substrate and the boron coating into a neutron detector as at least a portion of a exterior shell.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
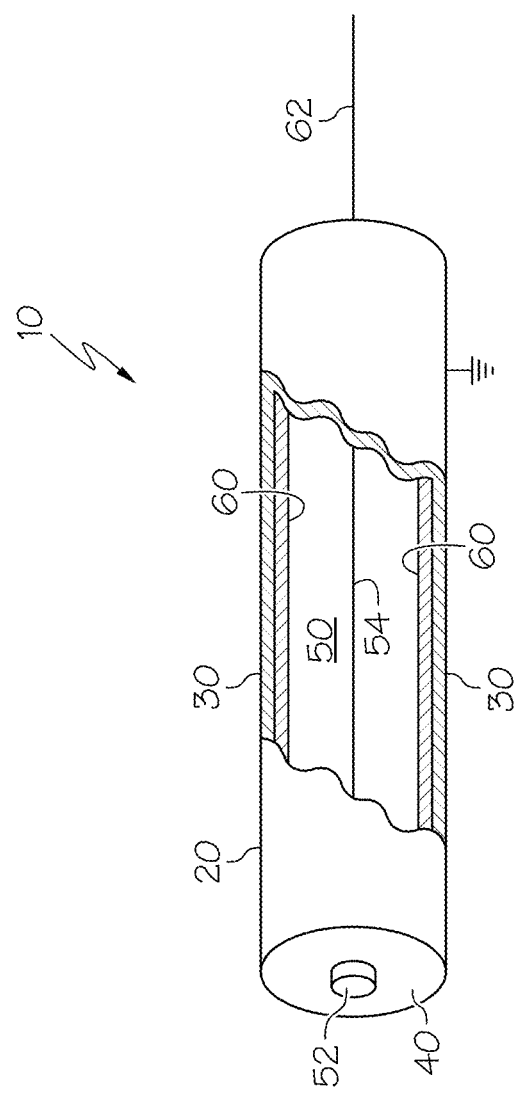
FIG. 1 is a schematized view of an example neutron detector with a boron coating in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

A schematic rendering of an example neutron detector 10 is generally shown within FIG. 1. It is to be appreciated that FIG. 1 shows one example of possible structures/configurations/etc. and that other examples are contemplated within the scope of the present invention. In one specific example, the neutron detector 10 is used for detecting passing neutrons, for example, by observing the charged particles released in nuclear reactions induced by the neutrons. Neutron detectors 10 can be used in various applications such as radiation monitoring of spent nuclear fuel or in homeland security applications.

The neutron detector 10 can include an exterior shell 20. The exterior shell 20 may have a circular cross-section, forming a cylindrical exterior shell 20, although other cross-section shapes are also contemplated. The exterior shell 20 can include a wall 30 and two ends 40 to bound an interior volume 50 that can contain a gas. In an electrical circuit, the exterior shell 20 can act as a cathode portion. Although the disclosed example presents the exterior shell 20 acts as a cathode portion it should be appreciated that other portions can be present and act as a cathode. For example the neutron detector may include one or more inserts (e.g., fins, projections, etc.) within the interior volume 50 and electrically connected to the exterior shell 20. An insulator 52 can be located on the two ends 40 of the exterior shell 20 to hold a central structure 54 in place and prevent electrical charges from passing between the central structure 54 and the exterior shell 20 through direct contact. The central structure 54 can be generally located near the central axis of the exterior shell 20. The central structure 54 can be of similar proportions to a wire, and can act as an anode in an electrical circuit. A boron coating 60 covers the interior surface of the wall 30. The neutron detector 10 also includes an electrical connector 62 mounted on one of the insulators 52 for transmission of a signal collected by the central structure 54.

Figure 2:
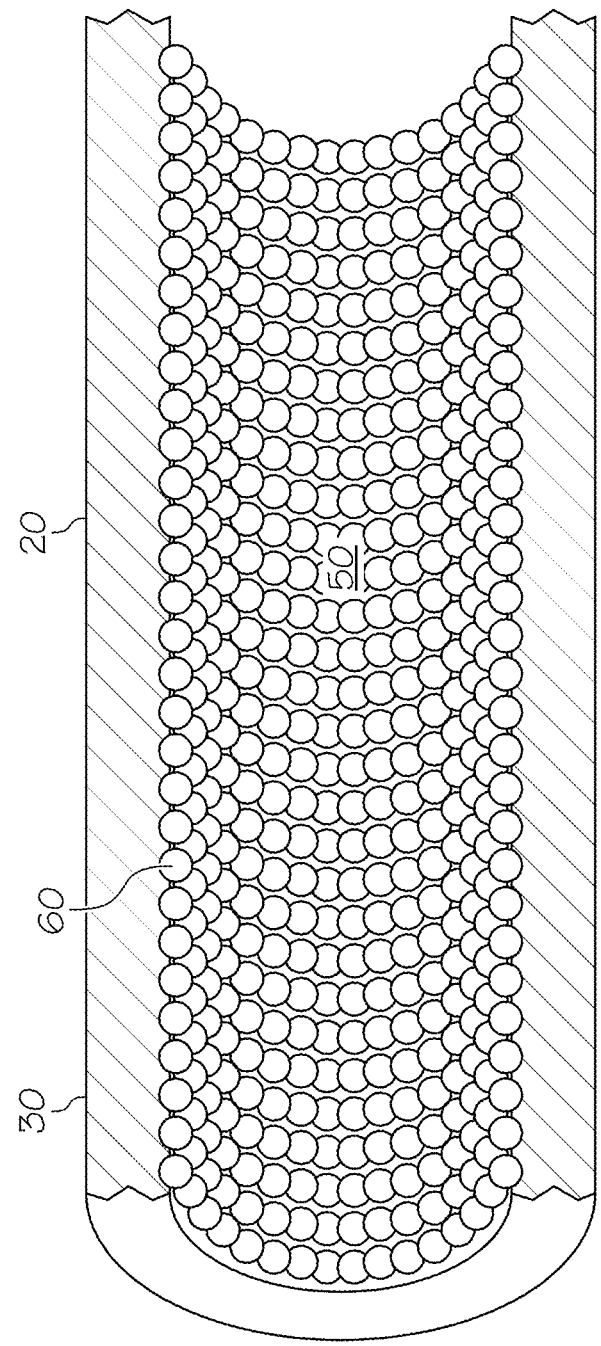
FIG. 2 is a cross-sectional view of a portion of the example neutron detector of FIG. 1 depicting a boron coating that has been heat diffused into a substrate in accordance with an aspect of the present invention.

Turning to FIG. 2, the boron coating 60 can be applied to the interior surface of the wall 30 of the exterior shell 20 by a heat diffusion process. Of course, if other portions are present (e.g., one or more inserts) such other portion(s) can have the boron coating applied thereon. The heat diffusion process can be used to place a boron coating 60 on the surface of the wall 30 that faces the interior volume 50. It is to be appreciated that the particles making up the boron coating 60 shown in FIG. 2 are for illustration purposes only and do not represent actual particle sizes or scale sizes and thus should not be used for relative dimensioning. Furthermore, the particle shapes are only representations of boron-containing powder particles. Particles of the boron-containing powder can include regular and irregular shapes and profiles.

Heat diffusion is the transport of a material from an area of high concentration to an area of low concentration through random movement of the material's constituent molecules. Boron can be diffused into a substrate material by providing an elevated temperature surrounding the substrate while the boron is in intimate contact with the substrate. Heat diffusion can begin at about the annealing temperature of the substrate. Examples of a substrate include, but are not limited to nickel, aluminum, stainless steel, and titanium.

Some heat diffusion applications of boron-containing powder can include the use of a fluxing agent. Fluxing agents can be used to remove layers of oxidized metal that can be present on the substrate surface. The fluxing agents can be used to remove any oxidized metal prior to the heat diffusion process in order to facilitate the boron molecule penetration into the surface of the substrate. For example, a slurry of boron-containing powder may include hydrochloric acid (HCl) to remove oxides of aluminum from an aluminum substrate surface that can inhibit boron molecules from penetrating the surface of the substrate during the heat diffusion process.

The substrate can be metallurgically treated with boron-containing powder prior to exposing the powder and the substrate to an elevated temperature. The boron-containing powder can be applied to the substrate surface by several methods. For example, the substrate surface can be packed with a dry powder so that the dry powder is in intimate contact with the substrate surface. In another example, the boron-containing powder can be included in a brush-applied slurry or paste. The paste can include the boron-containing powder and a solution of 10% HCl and 90% de-ionized water ($H_2O$). In another example, the boron-containing powder can be included in a slurry with isopropyl alcohol. In yet another example, the boron-containing powder can be applied to the substrate surface with an electrostatic spray operation. The foregoing are merely examples of boron-containing powder application and other application methods are contemplated.

The heat diffusion process diffuses the boron atoms into the metallic substrate forming an intermetallic compound at the surface of the substrate base metal. For the purposes of neutron detection, it is desirable to diffuse the boron into the surface of the substrate, but not necessarily create an alloy between the boron and the substrate material. Uniform diffusion depths are controlled by process variables such as the length of time of the diffusion process and the temperature of the diffusion process. For example, the amount of boron diffusion into the substrate is directly related to the length of time of the heat diffusion process. The longer the time period of the heat diffusion process, the more boron diffuses into the substrate. Likewise, the rate of diffusion of the boron into the substrate is directly related to the temperature of the heat diffusion process. Thus, higher temperatures typically induce higher rates of diffusion into the substrate. However, higher temperatures of the heat diffusion process can also cause the diffusion to occur at increasingly diffuse areas causing some surface areas of the substrate to have voids in the boron coating 60. Thus, it is at times desirable to select process variables to include lower heat diffusion temperatures and longer heat diffusion process times in order to promote a high concentration of boron coating 60 over as much of the substrate surface area as possible. In one example, all of the boron coating 60 is diffused into the wall 30 of the exterior shell 20. Typically, however, the boron coating 60 includes boron molecules that have been diffused into the surface of the substrate and a boron layer that remains on the surface of the substrate. Following the heat diffusion process, any excess boron-containing powder can be removed from the substrate surface by ultrasonic wave application or other known methods of removing excess boron-containing powder, however, this is not a necessary step.

One variable affecting neutron detector 10 efficiency is the percentage of the substrate surface area that is covered with the boron coating 60. For example, neutrons entering the neutron detector 10 are absorbed by the boron coating 60 which then releases other charged particles that can cause a cascade of particle interactions which then interact with the central structure 54 anode portion of the neutron detector 10. A typical neutron detector 10 relies on these released charged particles and the cascade of other resultant particle interactions to develop a signal representing a detected neutron or group of neutrons. If the neutron passing through the neutron detector 10 passes through an area devoid of boron coating 60, the typical molecular interactions will not take place, and a signal representing a detected neutron or group of neutrons will not be created at the central structure 54 anode. Thus, with other variables remaining equal, the ratio of substrate surface area covered by a working boron coating 60 is approximately equal to the effectiveness of the neutron detector 10. For example, if a boron coating 60 covers 92% of the substrate surface area, the neutron detector 10 will be 92% effective. Therefore, it is desirable to create a boron coating 60 covering as much substrate surface area as is practicably attainable. In order for the neutron detector 10 to be minimally effective, the boron coating 60 covers at least about 85% of the substrate surface.

It is to be understood that the boron-containing powder can include pure boron, a boron compound, or a mixture containing boron. The boron-containing powder can also include a specific ratio of the naturally occurring isotopes of boron. For example, the total boron content can be a minimum of about 97% by weight and the ratio of $^{10}B$ isotope to the total boron content can be a minimum of about 98% by weight. Boron has two naturally occurring isotopes, $^{10}B$ and $^{11}B$, typically found in a ratio of about 20% $^{10}B$ to about 80% $^{11}B$. In average circumstances, the two isotopes react quite differently when interacting with a free neutron.

Neutrons entering the neutron detector 10 are absorbed by the $^{10}B$ which then releases other charged particles that can cause a cascade of particle interactions which then interact with the central structure 54 anode portion of the neutron detector 10 (best seen in FIG. 1). A typical neutron detector 10 relies on these released charged particles and the cascade of other resultant particle interactions to develop a signal representing a detected neutron or group of neutrons. However, the $^{11}B$ isotope simply absorbs the neutron without releasing other charged particles, making $^{11}$B ineffective for use in neutron detection applications. This difference in neutron absorption behavior between the two naturally occurring boron isotopes means that, with other variables remaining equal, the ratio of $^{10}$B isotope to the total boron content is approximately equal to the effectiveness of the neutron detector 10. For example, with all other variables remaining equal, if a boron coating 60 contains 92% $^{10}$B and 8% $^{11}$B, the neutron detector 10 will be 92% effective (disregarding small quantities of impurities in the coating) over the coated area. Therefore, it is desirable to create a ratio of $^{10}$B isotope to the total boron content in the boron-containing powder that is as high as is practicably attainable.

One advantage of heat diffusion application of boron-containing powders is that the application requires very little or no binder to adhere the boron-containing powder to the substrate. The process is capable of creating comparatively high adherence in boron coatings 60 on a variety of substrates with very high boron to binder ratios. In one example of a boron-containing powder for neutron detection applications, soluble residue comingled with the boron powder is less than $7.00 \times 10^{-4}$ grams of soluble residue per gram of boron. One example of a soluble residue is an organic contaminant. It is to be appreciated that the term organic is a broad and expansive classification. In one part, the classification includes materials that contain a carbon component. The organic contaminants can be introduced to the boron powder during a jet milling operation from sources such as air compressor oils, particles of a polymeric liner material used on the interior of a jet mill, adhesive materials used to adhere polymeric liner material to the interior wall of a jet mill, and binder material. Heat diffusion of boron-containing powder do not necessarily require binders to adhere the powder to the conductive surface. As a result, the heat diffusion application of boron-containing powder can reduce the amount of soluble residue in the finished boron coating 60 as compared to some previously known boron application processes such as boron powder in oil with rubber binder based dispersions.

Optimal neutron detector 10 performance depends in part upon minimal levels of soluble residues in the boron powder applied to the wall 30 of the neutron detector 10. Soluble residues such as organic contaminants can outgas, introducing organic compounds to the interior volume 50 of the neutron detector 10. During the manufacturing process, the interior volume 50 is filled with a specific formulation of gases for effective operation of the neutron detector 10. The organic compounds resulting from outgassing can foul this specific formulation of gases and reduce the effective operation of the neutron detector 10. Thus, it is particularly desirable to have a boron-containing powder including relatively little or no binder, helping to keep contaminants to a level less than $7.00 \times 10^{-4}$ grams of soluble residue per gram of boron for neutron detection applications.

In one example, the boron-containing powder can include crystalline boron particles created by jet milling a boron feed stock to a specified particle size. For example, more than about 75% of the particles are less than about 1 micron in diameter, more than about 95% of the particles are less than about 3 microns in diameter, and essentially all of the particles are less than about 15 microns in particle diameter. Optimal neutron detector 10 performance depends in part upon a relatively thin boron coating 60 applied to the wall 30 of the neutron detector 10. Ideally, neutrons entering the neutron detector 10 are absorbed by the boron coating 60 which then releases other charged particles that can cause a cascade of particle interactions within the interior volume 50 which then interact with the central structure 54 anode portion of the neutron detector 10. However, if the heat diffused boron coating 60 is relatively thick, the boron will simply absorb the neutron without releasing other charged particles and become "self-trapping," rendering the neutron detector 10 ineffective. Therefore, it is desirable to utilize an boron-containing powder with particle sizes of about 1 micron in diameter to enable relatively thin coatings on the neutron detector wall 30. Boron particle sizing of about 1 micron is particularly effective for heat diffusion applications and also for various other methods of boron deposition for neutron detection. The desired boron diffusion depth into the substrate can be about 1 micron. The desired boron coating 60 thickness in a neutron detector 10 can be 2-5 microns thick, or alternatively, 3-4 microns thick.

Heat diffusion of boron-containing powders into a substrate for use in a neutron detector 10 has the benefit of creating a boron coating 60 that conforms to the microfeatures of the substrate. Microfeatures such as elevations and depressions on the face of the substrate can be inadequately covered by typical boron coating applications. For example, one method of a boron coating application includes dipping the conductive surface into water-based dispersions of boron or boron compounds. The capillary action of the water molecules can preclude the boron or boron compounds from completely covering the microfeatures of the conductive surface. Some applications of boron coatings for a neutron detector 10 can involve a slurry application of the boron coating to the interior of a cylindrical body. During subsequent drying operations, gravitational force can affect the thickness of the boron coating 60, as the slurry can flow prior to complete drying.

Other coating techniques such as electrostatic sprays and most vapor deposition techniques have line-of-site limitations. These limitations can inhibit the uniform application of boron-containing powder over the surface of the substrate due to shadows cast by the microfeature elevations relative to the point source of the boron-containing powder. Electrostatic sprays and most vapor deposition techniques have been found to include "shadow gaps" or voids in the resulting boron coating 60. The voids occur because some areas of the substrate surface are sufficiently hidden from the point source of the boron-containing powder. As such, the boron-containing powder does not deposit or adhere effectively to the steeply sloped surfaces of the substrate or the surfaces hidden behind microfeature elevations on the surface. This results in formation of shadow gaps, composed of voids and regions of partial boron coating 60. As described previously, the reduction in the ratio of boron coating area to the total substrate surface area reduces the effectiveness of the neutron detector 10. Thus, it is desirable to utilize a boron-containing powder deposition technique that is not subject to line of sight deposition techniques and resultant shadow gaps.

Figure 3:
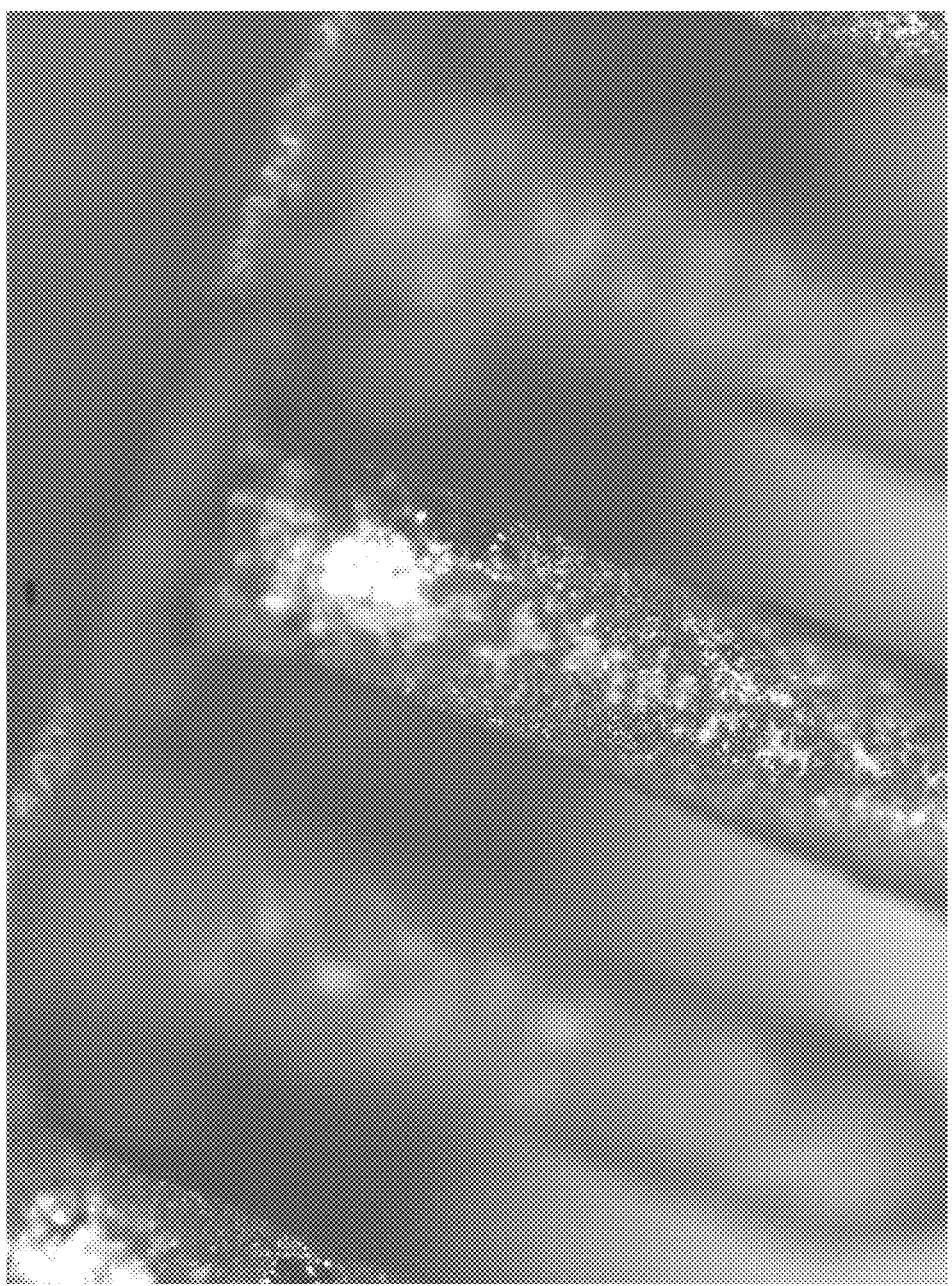
FIG. 3 is a photograph showing an example of a substrate with boron heat diffused into the surface of the substrate for neutron detection applications of FIG. 1.

A photograph of an example nickel substrate with a heat diffused boron coating 60 is shown in FIG. 3. The substrate has pillars protruding with a pillar height of approximately 400 microns. The points resembling dark specks or needle points are boron particles heat diffused into the surface of the nickel substrate. These points would be viewed as brown or brown-black in a color photograph. The brightest areas of FIG. 3 are areas of visible nickel and would be viewed as white in a color photograph.

Figure 4:
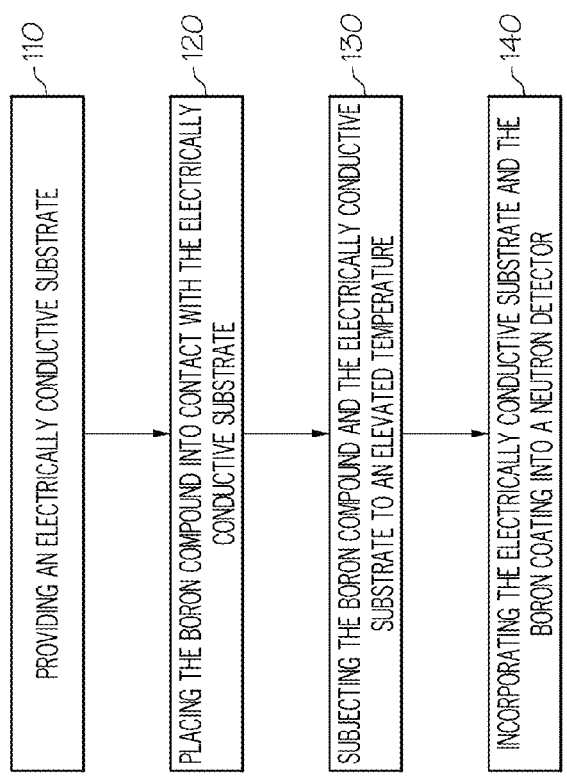
FIG. 4 is a top level flow diagram of a method of diffusing a boron-containing powder into a substrate surface to create a neutron capture layer for neutron detectors in accordance with an aspect of the present invention.

An example method of heat diffusing a boron coating 60 on a conductive surface of a neutron detector 10 is generally described in FIG. 4. The method can be performed in connection with the example neutron detector 10 shown in FIG. 1 and the application of heat diffused boron-containing powders shown in FIG. 2. The method includes the step 110 of providing an electrically conductive substrate. The conductive substrate can be manufactured from metals such as nickel, aluminum, and titanium, although other materials are also contemplated, including non-metals with a metalized surface. The conductive substrate can be in the form of a hollow cylinder, although other hollow geometric shapes are also contemplated. For example, a simple sheet could be used and the sheet can subsequently be formed into any desired shape.

The method also includes the step 120 of placing the boron-containing powder into contact with the electrically conductive substrate. The boron-containing powder can be applied to the substrate surface by several methods. For example, the substrate surface can be packed with a dry powder so that the dry powder is in intimate contact with the substrate surface. In another example, the boron-containing powder can be included in a brush-applied slurry or paste. The paste can include the boron-containing powder and a solution of HCl and de-ionized $H_2O$. In another example, the boron-containing powder can be included in a slurry with isopropyl alcohol. In yet another example, the boron-containing powder can be applied to the substrate surface with an electrostatic spray operation. The foregoing are merely examples of boron-containing powder application and other application methods are contemplated. Following the application of the boron-containing powder to the substrate surface, any excess boron-containing powder can be removed from the substrate surface by ultrasonic wave application or other methods of removing excess boron-containing powder.

The method also includes the step 130 of subjecting the boron-containing powder and the electrically conductive substrate to an elevated temperature. The elevated temperature promotes a heat diffusion process which is the transport of a material from an area of high concentration to an area of low concentration through random movement of the material's constituent molecules. The heat diffusion process diffuses the boron atoms into the metallic substrate forming an intermetallic compound at the surface base metal. For the purposes of neutron detection, it is desirable to diffuse the boron into the surface of the substrate, but not necessarily create an alloy between the boron and the substrate material. In one example, the entire boron coating 60 is diffused into the wall 30 of the exterior shell 20. Typically, however, the boron coating 60 includes boron molecules that have been diffused into the surface of the substrate and a boron layer that remains on the surface of the substrate.

The method also includes the step 140 of incorporating the electrically conductive substrate and the boron coating 60 into a neutron detector 10. The conductive substrate can be used as the wall 30 of the exterior shell 20 of the neutron detector 10. Neutrons entering the neutron detector 10 are absorbed by the boron coating 60 which then releases other charged particles that can cause a cascade of particle interactions which then interact with the central structure 54 anode portion of the neutron detector 10. A typical neutron detector 10 relies on these released charged particles and the cascade of other resultant particle interactions to develop a signal representing a detected neutron or group of neutrons.

In a further example, the method includes the boron coating 60 covering at least about 85% of the substrate surface. With other variables remaining equal, the ratio of substrate surface area covered by a working boron coating 60 is approximately equal to the effectiveness of the neutron detector 10. For example, if a boron coating 60 covers 92% of the substrate surface area, the neutron detector 10 will be 92% effective. Therefore, it is desirable to create a boron coating 60 covering as much substrate surface area as is practicably attainable.

In a further example, the method can include a boron-containing powder can also include a specific ratio of the naturally occurring isotopes of boron. For example, the total boron content can be a minimum of about 97% by weight and the ratio of $^{10}B$ isotope to the total boron content can be a minimum of about 98% by weight. Neutrons entering the neutron detector 10 are absorbed by the $^{10}B$ which then releases other charged particles that can cause a cascade of particle interactions which then interact with the central structure 54 anode portion of the neutron detector 10 (best seen in FIG. 1). A typical neutron detector 10 relies on these released charged particles and the cascade of other resultant particle interactions to develop a signal representing a detected neutron or group of neutrons. With other variables remaining equal, the ratio of $^{10}B$ isotope to the total boron content is approximately equal to the effectiveness of the neutron detector 10. Therefore, it is desirable to create a ratio of $^{10}B$ isotope to the total boron content in the boron-containing powder that is as high as is practicably attainable.

In yet a further example, the method can include a boron-containing powder with reduced contaminant levels. Optimal neutron detector 10 performance depends in part upon minimal levels of soluble residues in the boron-containing powder applied to the neutron detector 10 surface. Soluble residues such as organic contaminants can outgas, introducing organic compounds to the interior volume 50 of the neutron detector 10. During the manufacturing process, the interior volume 50 is filled with a specific formulation of gases for effective operation of the neutron detector 10. The organic compounds resulting from outgassing can foul this specific formulation of gases and reduce the effective operation of the neutron detector 10. Thus, it is particularly desirable to have a boron-containing powder including contaminants at a level less than $7.00 \times 10^{-4}$ grams of soluble residue per gram of boron for neutron detection applications.

Example 1

A nickel substrate was borided using a heat diffusion process. The nickel substrate was packed in a boron powder and propanol was used to promote intimate contact and wetting of the boron-containing powder with the nickel substrate surface. The propanol was evaporated in a drying oven. The nickel substrate packed with boron-containing powder was then heated in a furnace containing a 75% nitrogen and 25% hydrogen cover gas at 580° C. for 5 hours. Alternatively, the nickel substrate packed with boron-containing powder was heated in a furnace containing the same cover gas at 960° C. for 20 minutes. Excess boron-containing powder was then removed from the surface of the nickel substrate by ultrasonication.

Example 2

A titanium substrate was borided using a heat diffusion process. The titanium substrate was packed in a boron powder and propanol was used to promote intimate contact and wetting of the boron-containing powder with the titanium substrate surface. The propanol was evaporated in a drying oven. The titanium substrate packed with boron-containing powder was then heated under a vacuum condition in a radio frequency (RF) coil to 910° C. for 10 minutes.

Example 3

An aluminum substrate was borided using a heat diffusion process. The aluminum substrate was coated with a boron-containing slurry. The liquid component of the slurry included 10% HCl to act as a fluxing agent and 90% $H_2O$. The slurry was applied to a coupon of aluminum and heated on a hot plate to approximately 320° C. The aluminum coupon was then ultrasonicated to remove loosely adhered material and a permanent brown stain was noted on the aluminum. The permanent brown stain on the aluminum coupon is indicative of the presence of boron.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A neutron detector including:
a shell bounding an interior volume;
a metallic portion serving as a cathode;
a central structure located within the interior volume and serving as an anode;
a boron coating on the cathode portion wherein at least some of the boron coating is heat diffused into the cathode portion from a boron-containing powder with some boron atoms at depth into the metallic portion to form the boron coating which is sensitive to neutrons; and
an electrical connector operatively connected to the central structure for transmission of a signal collected by the central structure.

2. A The neutron detector according to claim 1, including:
a shell bounding an interior volume;
a portion serving as a cathode;
a central structure located within the interior volume and serving as an anode;
a boron coating on the cathode portion wherein at least some of the boron coating is heat diffused into the cathode portion from a boron-containing powder to form the boron coating which is sensitive to neutrons; and
an electrical connector operatively connected to the central structure for transmission of a signal collected by the central structure;
wherein all of the boron coating is diffused into the cathode portion.

3. The neutron detector according to claim 1, wherein the shell includes a bounding wall and the cathode portion is at least part of the wall.

4. The neutron detector according to claim 3, wherein at least 85% of a surface of the wall is covered by the boron coating.

5. The neutron detector according to claim 3, wherein the wall is a cylinder.

6. The neutron detector according to claim 1, wherein the boron coating includes a minimum total boron content of about 97% by weight and a minimum ratio of $^{10}B$ isotope to a total boron content of about 98% by weight.

7. The neutron detector according to claim 1, wherein the boron coating includes less than $7.00 \times 10^{-4}$ grams of a soluble residue per gram of boron.

8. A method of diffusing a boron-containing powder into a substrate surface to create a neutron capture layer for neutron detectors, the method including:
providing an electrically conductive, metallic substrate;
placing the boron-containing powder into contact with the electrically conductive substrate;
subjecting the electrically conductive substrate to a surrounding elevated temperature to simultaneously raise the temperature of all of the boron-containing powder and the entire electrically conductive substrate to an the elevated temperature so that a quantity of the boron-containing powder heat diffuses into the electrically conductive substrate simultaneously over the electrically conductive substrate to which the boron-containing powder is placed in contact with some boron atoms at depth into the electrically conductive substrate forming a boron coating which is sensitive to neutrons; and
incorporating the electrically conductive substrate and the boron coating into a neutron detector as at least a portion of an exterior shell.

9. The method according to claim 8, wherein all of the boron coating is diffused into the electrically conductive substrate.

10. The method according to claim 8, wherein the step of providing an electrically conductive substrate includes providing the substrate as at least part of a wall of a shell that bounds an interior volume.

11. The method according to claim 8, wherein at least 85% of a surface of the wall is covered by the boron coating.

12. The method according to claim 8, wherein the wall is a cylinder.

13. The method according to claim 8, wherein the boron coating includes a minimum total boron content of about 97% by weight and a minimum ratio of $^{10}B$ isotope to a total boron content of about 98% by weight.

14. The method according to claim 8, wherein the boron coating includes less than
$7.00 \times 10^{-4}$ grams of a soluble residue per gram of boron.

15. The neutron detector according to claim 1, wherein the shell includes aluminum.

16. The neutron detector according to claim 1, wherein the some boron atoms are to a uniform depth into the metallic portion.

17. The method according to claim 8, wherein the some boron atoms diffused into the metallic substrate and the metallic substrate form an intermetallic compound.

18. The method according to claim 8, wherein the electrically conductive, metallic substrate includes aluminum.

19. The method according to claim 8, wherein the some boron atoms are to a uniform depth into the metallic portion.

20. The method according to claim 8, wherein the some boron atoms diffused into the metallic substrate and the metallic substrate form an intermetallic compound, and with the heat diffusion begin at about an annealing temperature of the substrate.

* * * * *